Patented Jan. 16, 1923.

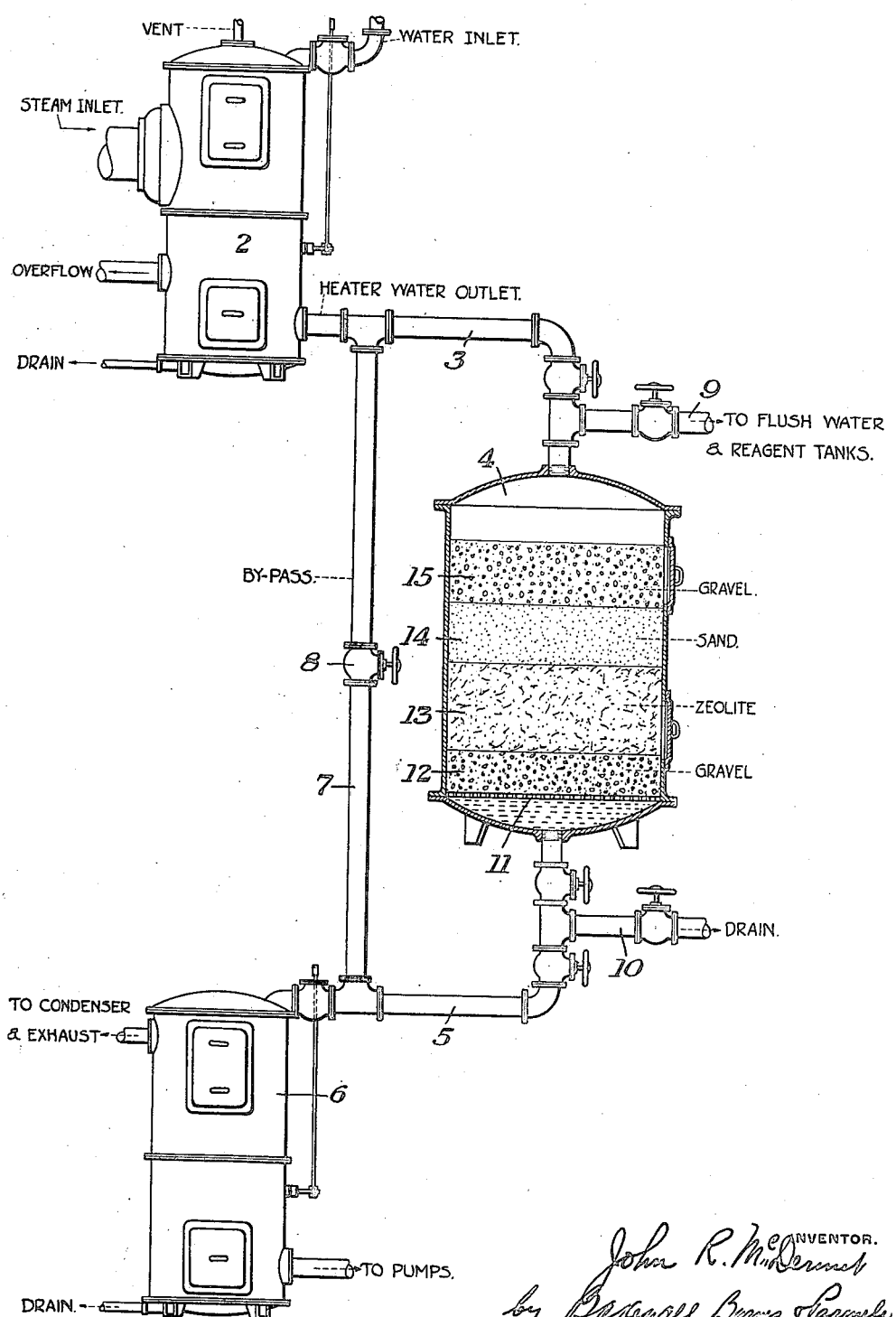

1,442,348

UNITED STATES PATENT OFFICE.

JOHN R. McDERMET, OF JEANNETTE, PENNSYLVANIA, ASSIGNOR TO ELLIOTT COMPANY, OF PITTSBURGH, PENNSYLVANIA, A CORPORATION OF PENNSYLVANIA.

METHOD AND APPARATUS FOR THE TREATMENT OF WATER.

Application filed January 31, 1921. Serial No. 441,274.

*To all whom it may concern:*

Be it known that I, JOHN R. McDERMET, residing at Jeannette, Westmoreland County, Pennsylvania, have invented a new and useful Improvement in Methods and Apparatus for the Treatment of Water, of which the following is a full, clear, and exact description, reference being had to the accompanying drawings, forming part of this specification, in which—

The figure is a view largely diagrammatic showing partly in side elevation and partly in vertical section a preferred form of the apparatus for carrying out my invention.

My invention has relation to the treatment of water, particularly feed water for use in boilers and heating apparatus.

The object of my invention is to provide a method of treatment by which the water delivered to the boiler or other heater will be substantially free from air and other dissolved gases, and also from scale-forming compounds.

A further object of my invention is to provide apparatus of simple and effective character by which my improved method may be carried out.

It is well known that oxygen and free or "half bound" carbon dioxide, contained in boiler feed water, are largely responsible for the internal corrosion which occurs in steam and heating systems and many attempts have been made to free the feed water of these elements. It is also well known that carbonates, such as magnesium and calcium carbonates, constitute the bulk of scale-forming materials in normal waters, and it is highly desirable that these should be removed or rendered soluble to prevent scale formation.

For certain purposes, the treatment of water by passing it through zeolite filter beds has proved effective, particularly in textile work, but this method of treatment has not been satisfactory in boiler practice, since it does not remove oxygen nor free carbon dioxide which remains in solution. As a result, carbon dioxide is carried into the boiler where it is regarded as highly objectionable, inasmuch as it appears to accelerate electrolytic corrosion by acting as an electrolyte. Furthermore, the use of filter beds of zeolites necessitates frequent regeneration of the zeolite. As ordinarily applied to the art of water treatment, zeolites or exchange base silicates are complex aluminum silicates. At the outset, the complex silicate is made up, for instance, of sodium aluminum bases. In passing through the zeolite filter beds, calcium and magnesium compounds, which are dissolved in the water in any form such that they will precipitate in an insoluble form in the boiler in the subsequent evaporation or will react chemically with other compounds dissolved in the water under the boiler conditions to form an insoluble precipitate, interchange bases with the sodium of the zeolite and become sodium compounds which are completely soluble under moderate and usual boiler pressure.

I have discovered that the zeolite method of treatment may be rendered much more effective and well adapted for use in the treatment of boiler feed water by combining therewith a proper method of extracting air and other dissolved gases from the water such as carbon dioxide.

For this purpose, I prefer to employ the method of treatment which is described and claimed in the patent to William S. Elliott, No. 1,321,999, dated November 18, 1919.

The method described in that patent is capable of removing dissolved oxygen and carbon dioxide from water and is also capable of decomposing bicarbonates of calcium and magnesium.

In accordance with my invention, I first pass the water to be treated through a zeolite softener and then pass the water, so treated, through a separator of the character described and claimed in the said patent. Preferably, the zeolite softener is interposed between the heater, such as shown in said patent, and the evaporating or separating chamber.

In the accompanying drawing, the numeral 2 designates the heater having the outlet 3 leading to the top of the zeolie-containing vessel 4. From the bottom of this vessel, a pipe 5 leads into the separator or evaporator 6. 7 indicates a bypass around the zeolite-containing vessel, and which is provided with a suitable shutoff valve 8. 9 designates a connection for admitting flushing water to the vessel 4, and 10 is a drain for said vessel.

Other features of the water heater and separator similar to those shown in the said patent are clearly indicated by the legends on the drawing.

Preferably, the vessel 4 contains a bottom grid 11, supporting thereon a lower layer 12 of gravel above which the zeolite 13 is placed. Above this, a layer of sand 14 having a superimposed layer of gravel 15 may be employed. I do not, however, limit myself to any particular arrangement of the zeolite and filter elements in said vessel 4.

By subjecting the water to the action of the zeolite before the water is passed into the separator, I overcome the increased solubility of water of high carbonate alkalinity for dissolved gases. Furthermore, it is frequently necessary to regenerate the zeolite in the vessel 4, during which operation this vessel must be flushed and washed with impure waters which will contain air in solution. It is impossible in putting the softener back in operation to avoid including this quantity of water contained in the softener as a result of flushing, but by the arrangement described, I avoid passing to the boilers any water which has not gone through the softener or separator.

The use of the open heater results in some air being removed at that stage of the treatment. Some bicarbonate precipitation will also occur in the heater, thereby to that extent reducing the subsequent work on the zeolite filter.

As a result of my method of treatment, the water delivered to the boiler is substantially free from oxygen and from "half bound" carbon dioxide, and the scale-forming compounds are eliminated to a maximum extent.

I claim:

1. The herein described method of treating water, which consists in first passing the water through a zeolite filter, and then introducing it into an evaporator in which the pressure is lower than the pressure corresponding to the temperature of the water before it enters the evaporator, to remove entrained air and gases and any air which may have leaked into the filter, substantially as described.

2. The herein described method of treating water, which consists in passing the water through a zeolite filter, and then extracting from the water the air and other gases dissolved therein as well as any air which may have leaked into the filter and simultaneously precipitating therefrom the contained scale-forming carbonates, substantially as described.

3. Apparatus for the treatment of water, comprising a zeolite filter, a separator for removing air and other dissolved gases and whose inlet is connected to the outlet of the filter, and means for maintaining in the separator a pressure which is lower than the pressure corresponding to the temperature of the water before it enters the separator, substantially as described.

4. Apparatus for the treatment of water, comprising a heater, a zeolite filter having its filter chamber connected to the outlet of the heater, a separator for removing air and other dissolved gases and having its inlet connected to the outlet of the zeolite filter, and means for maintaining in the separator a pressure which is definitely lower than the pressure corresponding to the temperature of the water before it enters the evaporator, substantially as described.

5. Apparatus for the treatment of water, comprising a heater, a zeolite filter having its filter chamber connected to the outlet of the heater, a separator for removing air and other dissolved gases and having its inlet connected to the outlet of the zeolite filter, and means for maintaining in the separator a pressure which is definitely lower than the pressure corresponding to the temperature of the water before it enters the evaporator, said zeolite filter having flushing connections and there also being a bypass connection around said filter and between the heater and the separator, substantially as described.

6. Apparatus for the treatment of water, comprising a heater, a zeolite filter, having its filter chamber connected to the outlet of the heater, a separator for removing air and other dissolved gases and having its inlet connected to the outlet of the zeolite filter, means for maintaining in said separator a pressure which is definitely lower than the pressure corresponding to the temperature of the water before it enters the separator, said means also acting to remove the separated air and gases from the separator, substantially as described.

7. In the method of treating feed water of high carbonate alkalinity, the steps consisting of passing the water through a zeolite softener, and then degasifying the water to overcome the disadvantages of increased solubility, substantially as described.

8. In the method of treating feed water, the steps consisting of removing from the water a portion of the dissolved bicarbonates, then passing the water with the decreased bicarbonate content to a zeolite softener, whereby the base exchanging properties of the zeolite are conserved, and then degasifying the water, substantially as described.

9. In the method of treating feed water, the steps consisting of removing from the water a portion of the dissolved bicarbonates, then substituting for the scale forming compounds in the water so treated non-scaling radicals by passing the water through a zeolite softener, and then degasifying the water, substantially as described.

In testimony whereof, I have hereunto set my hand.

JOHN R. McDERMET.